(12) United States Patent
Volkmuth et al.

(10) Patent No.: US 8,246,761 B2
(45) Date of Patent: Aug. 21, 2012

(54) WORKPIECE DESIGNED FOR ROLLING STRESSES AND FORMED OF FULLY HARDENING STEEL, AND A HEAT TREATMENT PROCESS THEREFOR

(75) Inventors: Johann Volkmuth, Niederlauer (DE); Michael Jung, Würzburg (DE)

(73) Assignee: Aktiebolaget SKF, Göteborg (SE)

( * ) Notice: Subject to any disclaimer, the term of this patent is extended or adjusted under 35 U.S.C. 154(b) by 991 days.

(21) Appl. No.: 12/284,588

(22) Filed: Sep. 22, 2008

(65) Prior Publication Data
US 2009/0078339 A1 Mar. 26, 2009

(30) Foreign Application Priority Data
Sep. 20, 2007 (DE) .......................... 10 2007 044 950

(51) Int. Cl.
C23C 8/26 (2006.01)

(52) U.S. Cl. ........................................ 148/318; 148/210

(58) Field of Classification Search .................. 148/210, 148/318
See application file for complete search history.

(56) References Cited

U.S. PATENT DOCUMENTS
4,470,854 A * 9/1984 Nakamura .................... 148/219
6,203,634 B1 3/2001 Volkmuth FOREIGN PATENT DOCUMENTS
| DE | 19849681 | 1/2000 |
| DE | 10161721 | 6/2003 |
| WO | WO0036164 | 6/2000 |

* cited by examiner

*Primary Examiner* — Jessee R. Roe
(74) *Attorney, Agent, or Firm* — Mark A. Ussai; Bryan Peckjian

(57) ABSTRACT

A workpiece is designed for rolling stresses and includes a body having a core zone and a carbonitrided surface zone which surrounds the core zone. The workpiece body is formed of a fully hardening steel. The core zone has a bainite microstructure as its main constituent. The surface zone of the workpiece has a mixed microstructure comprising martensite and bainite and the martensite in the surface zone constitutes a proportion of at least twenty percent by volume.

23 Claims, 1 Drawing Sheet

WORKPIECE DESIGNED FOR ROLLING STRESSES AND FORMED OF FULLY HARDENING STEEL, AND A HEAT TREATMENT PROCESS THEREFOR

This application claims priority to German Patent Application No. DE 10 2007 044 950.1, filed Sep. 20, 2007, the entire contents of which are incorporated herein by reference.

BACKGROUND OF THE INVENTION

The invention relates to a workpiece designed for rolling stresses, more particularly to such workpieces fabricated from fully hardening steel and a heat treatment process therefor.

Numerous forms of processes for the heat treatment of steel workpieces are known, such treatment processes generally being used to increase the hardness of the workpieces. The particular type of heat treatment process has a considerable influence on the final properties of the workpieces. As such, the choice of a suitable heat treatment process, in addition to the choice of a suitable steel composition, is of substantial importance to the service life of such workpieces. This is particularly true of workpieces that must satisfy high quality requirements and are exposed to high stresses for a prolonged period of use. In workpieces of this type, the quality may be very significantly dependent on the details of the heat treatment.

DE 101 61 721 B4 has disclosed a heat treatment process for a roller bearing component made from a fully hardening steel, in which first of all carbonitriding is carried out at 860° C. to 930° C. This is followed by austenitizing at 830° C. to 860° C. with a subsequent quench to 190° C. to 230° C. Finally, an isothermal transformation is carried out at between 190° C. and 230° C. followed by cooling to room temperature. The intention of this procedure is for the microstructure transformation in the core and in the surface layer of the component to take different forms and thereby to achieve a retained austenite content of less than 5% by volume in the core and a retained austenite content of more than 10% by volume in the surface layer.

DE 198 49 681 C1 has disclosed a process for the heat treatment of workpieces made from steel or cast iron, in which an austenitization is followed by rapid quenching to approximately the martensite start point. Then, the components are held at the bainite transformation temperature until a desired partial transformation of the microstructure into bainite has taken place. This is followed by rapid cooling to room temperature, brief holding at room temperature and short-time tempering.

SUMMARY OF THE INVENTION

In one aspect, the present invention is a workpiece designed for rolling stresses comprising a body having a core zone and a carbonitrided surface zone surrounding the core zone. The body is made of a fully hardening steel and the core zone has a primarily bainite microstructure. The surface zone has a mixed microstructure including martensite and bainite, the martensite being a proportion of at least twenty percent by volume of the surface zone.

In another aspect, the present invention is a process for the heat treatment of a workpiece subject to rolling stresses and made from fully hardening steel. The process comprises the steps of: carbonitriding a surface zone of the workpiece; bringing the workpiece to an austenitizing temperature; holding the workpiece within a first temperature range for a first period of time to transform a core zone surrounded by the surface zone into a microstructure primarily containing bainite; and cooling the workpiece from a temperature in the first temperature range to a temperature in a second temperature range at a sufficiently rapid rate to exceed an alloy-dependent critical cooling rate so as to transform a microstructure of the surface zone to include a martensite content of at least twenty percent by volume.

More specifically, the present invention is based on the object of designing a steel workpiece that is subject to rolling stresses in such a way that it has a high wear resistance, hardness, toughness and dimensional stability.

This object is achieved by a workpiece having the combination of features of claim 1.

The workpiece according to the invention is designed for rolling stresses and has a core zone and a carbonitrided surface zone which surrounds the core zone. The workpiece is made from a fully hardening steel. The core zone of the workpiece has a bainite microstructure. The workpiece is distinguished by the fact that its surface zone has as its main constituent a mixed microstructure comprising martensite and bainite and the martensite in the surface zone constitutes a proportion of at least 20% by volume.

In the workpiece according to the present invention, the benefits of the bainite microstructure and the martensite microstructure are combined in an advantageous way. The bainite microstructure in the core zone leads to a high toughness and dimensional stability. The mixed microstructure comprising martensite and bainite in the surface zone results in a high hardness and wear resistance. This combination gives a very durable and wear-resistant workpiece which even in the event of lack of lubrication or other unfavorable environmental conditions, such as the action of dirt, etc., does not generally suffer immediate damage.

It is preferable for the surface zone to have the mixed microstructure comprising martensite and bainite as its main constituent.

The workpiece may in particular be designed as a roller bearing component. The fully hardening steel may be a fully hardening roller bearing steel, in particular in accordance with DIN EN ISO 683-17. A steel of the 100Cr6 type or a high-alloy derivative is particularly advantageous.

In addition to bainite, the core zone of the workpiece may also contain carbides and/or retained austenite. It is advantageous for the dimensional stability if the core zone has a retained austenite content of at most 10% by volume, in particular at most 3% by volume.

In addition to martensite, the surface zone of the workpiece may contain carbides and/or retained austenite and/or bainite and/or nitrides. In particular, the surface zone may have a retained austenite content that is 5% by volume to 40% by volume higher than the retained austenite content of the core zone. The surface zone preferably has a retained austenite content of at least 10% by volume. Furthermore, the surface zone may have a nitrogen content of at least 0.1% by weight and at most 0.8% by weight.

The surface zone may be adjacent to the surface of the workpiece. Moreover, the surface zone may be at least 100 µm thick. Furthermore, the surface zone may be at most 800 µm thick, preferably at most 600 µm thick. A surface zone with dimensions of this nature offers a good wear resistance, while at the same time any effects on the dimensional stability of the workpiece are kept within limits. In terms of the dimensional stability of the workpiece, it is also advantageous for the core zone to have a greater volume than the surface zone.

The surface zone of the workpiece may have compressive residual stresses of between −600 MPa and −100 MPa. This has a positive effect on the durability of the workpiece. Furthermore, it is advantageous if the surface zone has a hardness that is at least 50 HV1 above the hardness of the core zone. Since a rolling contact is in each case formed with the surface zone and not with the core zone, the wear is primarily dependent on the properties of the surface zone. A high hardness generally has a positive effect on the wear properties. This is true in particular under operating conditions in which foreign particles may be present in the region of rolling contact. However, a very high hardness generally may also entail negative or undesirable properties. For example, with a workpiece having a very high hardness, it may be impossible to achieve a sufficiently high toughness. It is therefore expedient for a very high hardness to be provided locally in just the surface zone and to provide a lower hardness in the core zone. Such a workpiece preferably has a surface hardness of at least 60 HRC.

The surface zone of the workpiece may have a first layer that is free of carbides. The first layer may be adjacent to the workpiece surface. Furthermore, the first layer may be at most 250 μm thick. Moreover, the surface zone of the workpiece may have a second layer which contains carbides. The second layer may be arranged between the first layer and the core zone.

In the heat treatment process according to the present invention, which is particularly directed to the treatment of workpieces subject to rolling stresses and made from fully hardening steel, a surface zone of the workpieces is carbonitrided. Furthermore, in a core zone of the workpieces, which is surrounded by the surface zone, a transformation into a microstructure that contains bainite as its main constituent is effected by holding the workpieces within a first temperature range for a first period of time. The particular feature of the process according to the present invention consists in the fact that, after the first period of time, in the surface zone of the workpieces, a transformation is carried out into a microstructure which has a martensite content of at least 20% by volume, while cooling the workpieces from a temperature in the first temperature range to a temperature in a second temperature range, that exceeds the alloy-dependent critical cooling rate.

The workpieces may be held within the second temperature range for a second period of time. Moreover, the workpieces may be heated to a temperature within a third temperature range and may be tempered at a temperature within the third temperature range for a third period of time. This leads to a certain stabilization of the microstructure.

The carbonitriding may be carried out at temperatures between 840° C. and 890° C. The carbonitriding is preferably carried out in an atmosphere which contains between 1 and 20% by volume ammonia and has a C-level of between 0.8 and 1.2.

The first temperature range may be between about 210° C. and about 260° C. The second temperature range may have an upper end or limit of about 120° C. It is also possible for the second temperature range to have an upper end or limit of at most 10° C. or only to −50° C. Such low temperatures for the second temperature range lead to a particularly high hardness in the surface zone of the workpieces. The third temperature range may be between about 150° C. and about 300° C.

The first period of time of the process may have a duration of between 3 and 5 hours. The second period of time is a function of the time required to establish a uniform temperature distribution over the cross section of the workpiece. Times of between 1 and 4 hours are particularly suitable for the third period of time.

For the process according to the present invention, it is preferable to use a fully hardening steel with a carbon content of between 0.8% by weight and 1.2% by weight.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
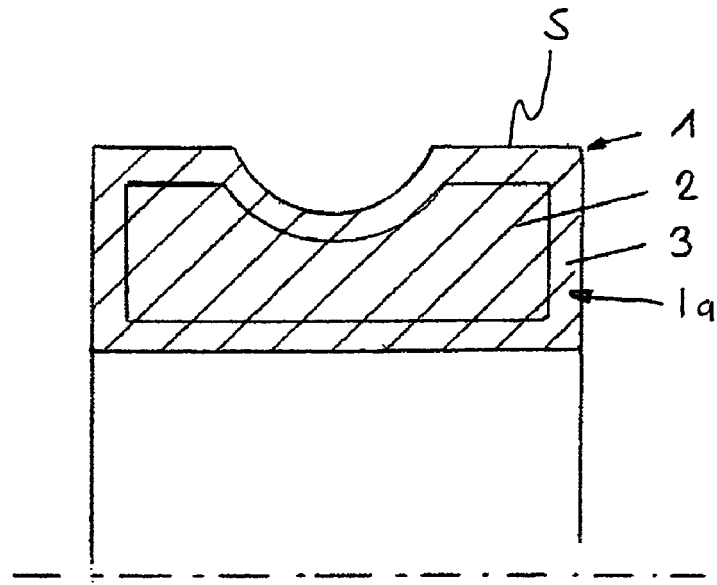
FIG. 1 depicts a schematic sectional illustration of a workpiece designed in accordance with the invention.

Referring now to the drawings in detail, wherein like numbers are used to indicate like elements throughout, there is shown in FIG. 1 a workpiece 1 designed or fabricated in accordance with the present invention. The illustration is not to scale and constitutes an idealized representation of the relevant conditions. Preferably, in the exemplary embodiment of the present invention, as illustrated in FIG. 1, the workpiece 1 is an inner raceway of a ball bearing. However, the workpiece 1 may alternatively be another component of a ball bearing, such as for example, an outer raceway or a rolling body, a component of a different type of bearing, or any other component that is subjected to rolling stresses, such as for example, a gearwheel.

Preferably, the workpiece 1 comprises a body 1a having a core zone 2 and a surface zone 3, which differ in terms of their microstructure. The surface zone 3 is adjacent to the outer surface S of the workpiece body 1a and surrounds the core zone 2. The thickness of the surface zone 3 is generally between 100 μm and 800 μm, preferably between 100 μm and 600 μm. Generally, there is no clearly defined transition between the core zone 2 and the surface zone 3; rather, the microstructure changes gradually within a transition range. The composition of the core zone 2 and of the surface zone 3 are each described in greater detail below.

Figure 2:
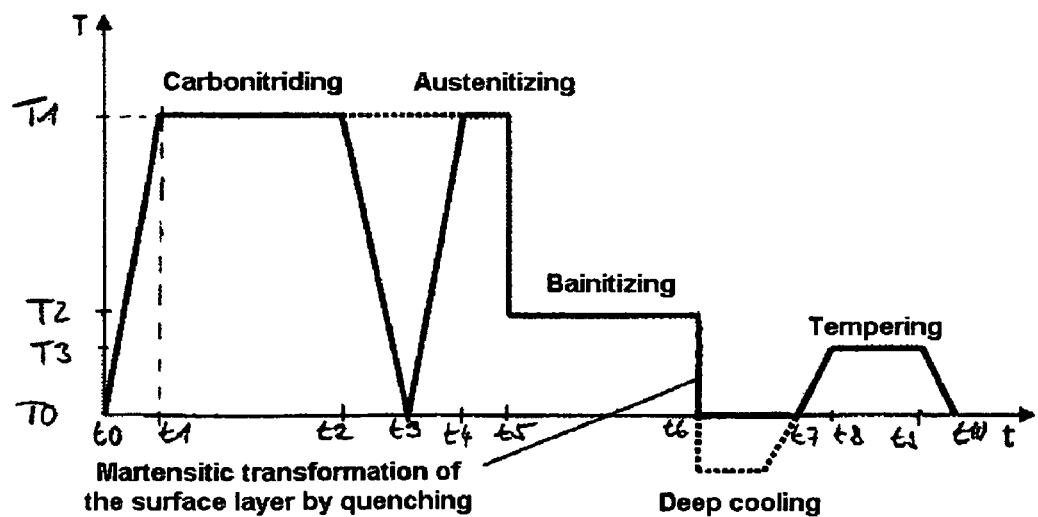
FIG. 2 depicts a schematic temperature-time diagram illustrating one possible procedure within the scope of the heat treatment process according to the invention.

FIG. 2 shows a schematic of a temperature-time diagram illustrating one possible procedure within the scope of the heat treatment process according to the present invention. The time is plotted on the abscissa and the workpiece temperature is plotted on the ordinate. For reasons of clarity, the curve is shown in abstracted form and in regions is extended or compressed in terms of time.

The body 1a of each of the workpieces 1 on which the heat treatment is carried out preferably formed of a fully hardening steel, for example a roller bearing steel in accordance with the DIN EN ISO 683-17 standard, more particularly of a low-alloy roller bearing steel. The temperature profile illustrated by way of example in FIG. 2 relates to the heat treatment of workpieces 1 made from a steel designated 100Cr6. Such a steel contains, based on its mass, 0.93 to 1.05% carbon, 1.35 to 1.60% chromium, 0.25 to 0.45% manganese, 0.15 to 0.35% silicon and up to 0.1% molybdenum. The phosphorus content is at most about 0.025%, while the sulphur content is at most about 0.015%. Moreover, small quantities of other elements may also be present for manufacturing reasons.

Prior to heat treatment, the workpieces 1 are preferably subjected to soft machining so as to convert each workpiece 1 into a desired shape. Such a shape may differ from the final shape of the workpieces 1 to compensate for further machining after the heat treatment.

In accordance with FIG. 2, the heat treatment process begins by the workpieces 1, in order for a carbonitriding to be carried out, being heated from a temperature T0 to a temperature T1, starting at a time t0 until a time t1. The temperature T0 may be room or ambient temperature. A temperature of twenty degrees Celsius (20° C.) is assumed herein for the value of room temperature unless stated otherwise. Preferably, the value of temperature T1 is, for example, between about eight hundred forty degrees Celsius (840° C.) and about eight hundred ninety degrees Celsius (890° C.).

The carbonitriding is carried out in an atmosphere that contains carbon and nitrogen. An atmosphere of this type may be formed, for example, by adding ammonia at between one percent (1%) and twenty percent (20%) by volume and a C-level of 0.8 to 1.2.

During the carbonitriding, the temperature of the one or more workpieces 1 is held within the temperature range specified for the particular, desired temperature T1. The carbonitriding is carried out during the period of time between the point in time t1 and the point in time t2. Preferably, this time period has a duration of approximately two (2) to eight (8) hours.

The carbonitriding leads to the surface zone 3 being enriched with carbon and nitrogen, with the result that the nitrogen content in the surface zone 3 is approximately 0.1% by weight to 0.8% by weight and the carbon content in the surface zone 3 is approximately 0.8% by weight to 1.2% by weight.

Following the carbonitriding, the workpieces 1 are cooled to the temperature T0 between the point in time t2 and a point in time t3. The temperature T0 may once again be room or ambient temperature.

Then, the workpieces 1 are brought to austenitization temperature, which in the curve illustrated corresponds to the temperature T1 used during the carbonitriding, i.e., in the temperature range between 840° C. and 890° C. The austenitization temperature is reached from a point in time t4 and held until a point in time t5.

As an alternative to this procedure, the austenitization may be carried out immediately after the carbonitriding, without intermediate cooling, i.e., may start from point in time t2.

At the point in time t5 the workpieces 1 are quickly cooled to a temperature T2 above the martensite start temperature, with the result that there is no significant formation of martensite. This rapid cooling is also referred to below as quenching and can be effected, for example, by cooling the workpieces 1 in molten salt. The temperature T2 may for example be in the temperature range from 210° C. to 260° C. The temperature T2 may also lie outside this temperature range. These values too are above the martensite start temperature.

The temperature of the workpieces 1 is preferably held constant at T2 until a point in time t6. Alternatively, it is possible to vary, in particular lower, the temperature of the workpieces 1 until the point in time t6. In this case, the temperature of the workpieces 1 is in each case held above the martensite start temperature.

The period of time between points in time t5 and t6 preferably has a duration of three (3) hours to five (5) hours. During this time period, the microstructure in the core zone 2 of the workpieces 1 is at least partially transformed from austenite to bainite. In the surface zone 3 of the workpieces 1, no transformation into bainite takes place, or such a transformation takes place to only a very limited extent. At any rate, at the point in time t6 the core zone 2 of the workpieces 1 has a significantly higher bainite content than the surface zone 3. The difference in the microstructure transformation of the core zone 2 and the surface zone 3 is caused in particular by the carbonitriding of the surface zone 3. The carbonitriding has the effect of delaying the bainite transformation in the surface zone 3 compared to the bainite transformation in the core zone 2, i.e., this transformation only takes place after a longer holding time at the transformation temperature. This means that at a point in time at which the bainite transformation in the core zone 2 is already well advanced, the bainite transformation in the surface zone 3 has not even started or is only at an early stage. If the further bainite transformation is stopped at this point by quenching the workpieces 1, the result is a core zone 2 with a high bainite content and a surface zone 3 with a low bainite content.

At the point in time t6, the workpieces 1 are quenched to the temperature T0, which may once again be in the region of room temperature or even below. As indicated by a dashed line in FIG. 2, the quenching may extend to temperatures of −50° C. or below. The quenching may be effected for example by means of oil or gas, in such a manner that the critical cooling rate, which is a function of the composition of the alloy, is exceeded. The cooling lasts for example at most two (2) minutes. The quenching leads, in the surface zone 3 of the workpieces 1, to a microstructure transformation, with in particular martensite being formed. During the quenching, at most a very small amount of martensite is formed in the core zone 2 of the workpieces 1. Therefore, after the point in time t6 the martensite content in the surface zone 3 is significantly higher than in the core zone 2.

After the quenching at the point in time t6, the workpieces 1 are held at the temperature T0 at least until a uniform temperature distribution has been established over the cross section of the workpiece. The workpieces 1 are then heated beyond a point in time t7 until a temperature T3 is reached at a point in time t8. If the quenching took place at very low temperatures, instead of holding at the temperature T0, the subsequent steps are deep cooling followed by heating to the temperature T3.

At the temperature T3, which may lie in a temperature range between about 150° C. and about 300° C., the workpieces 1 are tempered for approximately one (1) hour to four (4) hours, resulting in the martensite contained in the workpieces 1 being stabilized.

At a point in time t9, the tempering process is stopped and the workpieces 1, by a point in time t10, are cooled to the temperature T0, preferably room/ambient temperature. This cooling may be significantly slower than the quenching up to the point in time t6. The cooling ends the heat treatment process illustrated in FIG. 2. Further heat treatment steps may then follow, but these are not illustrated in FIG. 2, and the heat treatment may alternatively be completely finished at the point in time t10.

The workpieces 1 that have been heat-treated in the manner described above or in a similar manner according to the present invention have, in the surface zone 3, a mixed microstructure comprising martensite and bainite as a main constituent and, in the core zone 2, a bainite microstructure as a main constituent. The proportion of the martensite and/or bainite microstructure can in each case be determined from the volume of martensite or bainite in the core zone 2 or surface zone 3 based on the total volume of the core zone 2 or surface zone 3. The proportions of the other constituents can be determined in a similar way. Therefore, the content is in each case a mean concentration by volume, which is in each case referred to below as a percentage by volume or "% by volume". The abbreviation "% by weight" used below by analogy denotes a mean concentration by mass.

After the heat treatment process, the surface zone 3 of each workpiece 1 may have a martensite content of at least 20% by volume. The bainite content may be at most 70% by volume. The retained austenite content may be at least 10% by volume. In particular, the retained austenite content in the surface zone 3 may be 5% to 40% by volume higher than in the core zone 2. Furthermore, the surface zone 3 may have a nitrogen content of between 0.1 and 0.8% by weight and a carbon content of between 0.8 and 1.2% by weight. The carbon may be at least partially in the form of carbides. A layer directly adjacent to the surface of the workpieces 1 and up to 250 μm thick may be free of carbides. Carbides may be present in a further layer of the surface zone 3, which is arranged between the carbide-free layer and the core zone 2.

The surface hardness of the surface zone 3 may be at least 60 HRC. Moreover, the hardness of the surface zone 3 may be at least 50 HV1 above the hardness of the core zone 2. Furthermore, compressive residual stresses in a range between −600 MPa and −100 MPa may be formed in the surface zone 3.

The core zone 2 may have a greater volume than the surface zone 3. After the heat treatment process, the martensite content in the core zone 2 may be at most 10% by volume. The bainite content may be at least 80% by volume. The retained austenite content may be at most 10% by volume. In particular, it is also possible for the retained austenite content to be at most 3% by volume. The core zone 2 may also contain carbides.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

We claim:

1. A workpiece designed for rolling stresses, the workpiece comprising:
a body having a core zone and a carbonitrided surface zone surrounding the core zone, the body being made of a fully hardening steel and the core zone having a primarily bainite microstructure, the surface zone having a mixed microstructure including martensite and bainite, the martensite being a proportion of at least twenty percent by volume of the surface zone.

2. The workpiece according to claim 1, wherein the surface zone has a mixed microstructure including martensite and bainite as a main constituent.

3. The workpiece according to claim 1, wherein the workpiece is a roller bearing component.

4. The workpiece according to claim 1, wherein the fully hardening steel is a fully hardening roller bearing steel.

5. The workpiece according to claim 1, wherein the fully hardening steel is 100Cr6 and an alloy derivative.

6. The workpiece according to claim 1, wherein the core zone includes at least one of carbides and retained austenite.

7. The workpiece according to claim 1, wherein the core zone has a retained austenite content of at most ten percent by volume.

8. The workpiece according to claim 1, wherein the surface zone includes at least one of carbides, retained austenite, and nitrides.

9. The workpiece according to claim 1, wherein each of the surface zone and the core zone has a retained austenite content, the retained austenite content of the surface zone being between about five percent by volume greater and forty percent by volume greater than the retained austenite content of the core zone.

10. The workpiece according to claim 1, wherein the surface zone has a nitrogen content of at least 0.1% by weight and at most 0.8% by weight.

11. The workpiece according to claim 1, wherein the surface zone is adjacent to an outer surface of the body.

12. The workpiece according to claim 1, wherein a thickness of the surface zone is at least 100 μm.

13. The workpiece according to claim 1, wherein a maximum thickness of the surface zone is between 100 μm and 600 μm.

14. The workpiece according to claim 1, wherein a maximum thickness of the surface zone is 800 μm.

15. The workpiece according to claim 1, wherein the core zone has a greater volume than the surface zone.

16. The workpiece according to claim 1, wherein the surface zone has compressive residual stresses of between −600 MPa and −100 MPa.

17. The workpiece according to claim 1, wherein each of the surface zone and the core zone has a hardness, the hardness of the surface zone being at least 50HV1 greater than the hardness of the core zone.

18. The workpiece according to claim 1, wherein the body has a surface hardness of at least 60 HRC.

19. The workpiece according to claim 1, wherein the surface zone has a first layer that is substantially free of carbides.

20. The workpiece according to claim 19, wherein the first layer is adjacent to the body surface.

21. The workpiece according to claims 19, wherein the first layer has a thickness, the thickness of the first layer being at most 250 μm.

22. The workpiece according to claim 19, wherein the surface zone has a second layer which includes carbides.

23. The workpiece according to claim 22, wherein the second layer is arranged between the first layer and the core zone.

* * * * *